United States Patent
Zhang et al.

(10) Patent No.: US 10,571,968 B2
(45) Date of Patent: Feb. 25, 2020

(54) DISPLAY METHOD AND DISPLAY DEVICE FOR DISPLAYING PICTURE IN VISIBLE REGION OF FLEXIBLE DISPLAY SCREEN

(71) Applicants: BOE TECHNOLOGY GROUP CO., LTD., Beijing (CN); BEIJING BOE DISPLAY TECHNOLOGY CO., LTD., Beijing (CN)

(72) Inventors: Bin Zhang, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/773,335

(22) PCT Filed: Sep. 30, 2017

(86) PCT No.: PCT/CN2017/104940
§ 371 (c)(1),
(2) Date: May 3, 2018

(87) PCT Pub. No.: WO2018/153099
PCT Pub. Date: Aug. 30, 2018

(65) Prior Publication Data
US 2019/0079560 A1 Mar. 14, 2019

(30) Foreign Application Priority Data
Feb. 21, 2017 (CN) .............................. 201710093059

(51) Int. Cl.
G09G 3/20 (2006.01)
G06F 1/16 (2006.01)
(Continued)

(52) U.S. Cl.
CPC ............ *G06F 1/1652* (2013.01); *G06F 3/147* (2013.01); *G09F 9/301* (2013.01); *G09G 3/20* (2013.01);
(Continued)

(58) Field of Classification Search
CPC .................................. G09G 3/20; G09F 9/301
See application file for complete search history.

(56) References Cited

U.S. PATENT DOCUMENTS

| 6,304,820 B1 | 10/2001 | Goto et al. | |
| 2010/0117975 A1* | 5/2010 | Cho | G06F 1/1626 |
| | | | 345/173 |

(Continued)

FOREIGN PATENT DOCUMENTS

| CN | 103514814 A | 1/2014 |
| CN | 203721163 U | 7/2014 |

(Continued)

OTHER PUBLICATIONS

Chinese Office Action in corresponding Chinese Patent Application No. 201710093059.3 dated Aug. 28, 2018 (an English translation attached hereto). 23 pages.

International Search Report and Written Opinion for International Patent Application No. PCT/CN2017/104940 dated Dec. 28, 2017. English translation attached. 22 pages.

*Primary Examiner* — Lisa S Landis
(74) *Attorney, Agent, or Firm* — Leason Ellis LLP

(57) ABSTRACT

A display method and a display device based on a flexible display screen (11) are provided. The display method includes: determining a width (L3) of a visible region of the flexible display screen (11); determining data lines (111) within a range of the visible region of the flexible display screen (11) according to the width (L3) of the visible region of the flexible display screen (11); and outputting display data to the data lines (111) within the range of the visible region of the flexible display screen (11), so as to display a (Continued)

picture in the visible region of the flexible display screen (11). The power consumption of the flexible display screen (11) is reduced.

16 Claims, 4 Drawing Sheets

(51) Int. Cl.
  *G09F 9/30* (2006.01)
  *G06F 3/147* (2006.01)
(52) U.S. Cl.
  CPC ... *G09G 2310/04* (2013.01); *G09G 2330/021* (2013.01); *G09G 2340/0407* (2013.01); *G09G 2340/0492* (2013.01); *G09G 2380/02* (2013.01)

(56) References Cited

U.S. PATENT DOCUMENTS

| | | | |
|---|---|---|---|
| 2014/0002430 A1 | 1/2014 | Kwack et al. | |
| 2014/0009419 A1 | 1/2014 | Kim et al. | |
| 2017/0011714 A1* | 1/2017 | Eim | G09G 5/373 |

FOREIGN PATENT DOCUMENTS

| | | | |
|---|---|---|---|
| CN | 104021749 A | 9/2014 |
| CN | 104461444 A | 3/2015 |
| CN | 106200803 A | 12/2016 |
| CN | 106611592 A | 5/2017 |

\* cited by examiner

DISPLAY METHOD AND DISPLAY DEVICE FOR DISPLAYING PICTURE IN VISIBLE REGION OF FLEXIBLE DISPLAY SCREEN

CROSS REFERENCE OF RELATED APPLICATIONS

This application is a U.S. National Phase Application under 35 U.S.C. § 371 of International Patent Application No. PCT/CN2017/104940, filed Sep. 30, 2017, and claims the priority of Chinese Patent Application No. 201710093059.3 filed on Feb. 21, 2017, the disclosure of which are incorporated herein by reference in their entireties as part of the present application.

TECHNICAL FIELD

Embodiments of the present disclosure relate to a display method and a display device based on a flexible display screen.

BACKGROUND

With continuous development of display technology, flexible display technology has received more and more attention. Compared with a conventional display screen, a flexible display screen has characteristics of good bendability and good flexibility, which improves portability of a display device comprising the flexible display screen, and at a same time, reduces probability of damaging the display device.

At present, a display region of the flexible display screen does not vary with a visible region. When the visible region of the flexible display screen is reduced, a picture is displayed in the visible region of the flexible display screen, and the picture is still displayed in a non-visible region of the flexible display screen.

SUMMARY

According to embodiments of the disclosure, a display method based on a flexible display screen is provided. The display method comprises: determining a width of a visible region of the flexible display screen; determining data lines within a range of the visible region of the flexible display screen according to the width of the visible region of the flexible display screen; and outputting display data to the data lines within the range of the visible region of the flexible display screen, so as to display a picture in the visible region of the flexible display screen.

For example, at least one side of the flexible display screen is fixed onto a rotator, such that the width of the visible region of the flexible display screen is lengthened or shortened during rotation of the rotator; a first sensor is mounted on the rotator; and the determining the width of the visible region of the flexible display screen includes: directly measuring the width of the visible region of the flexible display screen by the first sensor.

For example, at least one side of the flexible display screen is fixed onto a rotator, such that the width of the visible region of the flexible display screen is lengthened or shortened during rotation of the rotator; and the determining the width of the visible region of the flexible display screen includes: determining a first rotation data of the flexible display screen, the first rotation data including a rotation rate and a rotation direction of the flexible display screen; determining a second rotation data of the flexible display screen, the second rotation data including a rotation time of the flexible display screen; and determining the width of the visible region of the flexible display screen according to the first rotation data and the second rotation data.

For example, the determining the width of the visible region of the flexible display screen according to the first rotation data and the second rotation data includes: performing an integral operation to determine a variation width of the flexible display screen according to the rotation rate and the rotation time; and determining the width of the visible region of the flexible display screen, according to an original display width of the flexible display screen, the variation width of the flexible display screen and the rotation direction; the original display width including a reset display width of the flexible display screen or a historical display width of the flexible display screen.

For example, the determining the width of the visible region of the flexible display screen according to the first rotation data and the second rotation data includes: performing an integral operation to determine a variation width of the flexible display screen according to the rotation rate and the rotation time; and determining the width of the visible region of the flexible display screen according to an original rotation width of the flexible display screen, a maximum width of the flexible display screen, the variation width of the flexible display screen and the rotation direction; the original rotation width including a reset rotation width of the flexible display screen or a historical rotation width of the flexible display screen.

For example, before the determining the first rotation data and the second rotation data of the flexible display screen, the method further comprises: performing a reset operation on the flexible display screen with the rotator, so that the flexible display screen has a reset display width and so that the flexible display screen has a reset rotation width.

For example, a second sensor is mounted on the rotator, and the first rotation data is measured by the second sensor.

For example, the at least one side of the flexible display screen is parallel to an extension direction of the data line.

For example, the rotator include a first rotator and a second rotator, a first side of the flexible display screen is fixed onto the first rotator, a second side of the flexible display screen is fixed onto the second rotator, and the first side and the second side of the flexible display screen are opposite to each other.

According to the embodiments of the disclosure, a display device based on a flexible display screen is provided. The display device comprises a control circuit. The control circuit includes: a display width determining sub-circuit, configured to determine a width of a visible region of the flexible display screen; a data line range determining sub-circuit, configured to determine data lines within a range of the visible region of the flexible display screen according to the width of the visible region of the flexible display screen; and a display data outputting sub-circuit, configured to output display data to the data lines within the range of the visible region of the flexible display screen, so as to display a picture in the visible region of the flexible display screen.

For example, the display device further comprises a rotator and a first sensor. At least one side of the flexible display screen is fixed onto the rotator, such that the width of the visible region of the flexible display screen is lengthened or shortened during rotation of the rotator; the first sensor is mounted on the rotator; and the display width determining sub-circuit is configured to: receive the width of the visible region of the flexible display screen directly measured by the first sensor.

For example, the display device further comprises a rotator. At least one side of the flexible display screen is fixed onto the rotator, such that the width of the visible region of the flexible display screen is lengthened or shortened during rotation of the rotator; the control circuit further includes: a first rotation data receiving sub-circuit, configured to receive a first rotation data of the flexible display screen, the first rotation data including a rotation rate and a rotation direction of the flexible display screen; and a second rotation data obtaining sub-circuit, configured to obtain a second rotation data of the flexible display screen, the second rotation data including a rotation time of the flexible display screen; and the display width determining sub-circuit is configured to: determine the width of the visible region of the flexible display screen according to the first rotation data and the second rotation data.

For example, the display width determining sub-circuit includes: a variation width determining sub-circuit, configured to perform an integral operation to determine a variation width of the flexible display screen according to the rotation rate and the rotation time; and a display width first determining sub-circuit, configured to determine the width of the visible region of the flexible display screen, according to an original display width of the flexible display screen, the variation width of the flexible display screen and the rotation direction; the original display width of the flexible display screen including a reset display width of the flexible display screen or a historical display width of the flexible display screen.

For example, the display width determining sub-circuit includes: a variation width determining sub-circuit, configured to perform an integral operation to determine a variation width of the flexible display screen according to the rotation rate and the rotation time; and a display width second determining sub-circuit, configured to determine the width of the visible region of the flexible display screen according to an original rotation width of the flexible display screen, a maximum width of the flexible display screen, the variation width of the flexible display screen and the rotation direction; the original rotation width of the flexible display screen including a reset rotation width of the flexible display screen or a historical rotation width of the flexible display screen.

For example, the control circuit further includes a reset operation sub-circuit, and the reset operating sub-circuit is configured to: control the rotator performing a reset operation on the flexible display screen, so that the flexible display screen has a reset display width and so that the flexible display screen has a reset rotation width, before the first rotation data receiving sub-circuit receives the first rotation data of the flexible display screen and the second rotation data obtaining sub-circuit obtains the second rotation data of the flexible display screen.

For example, the display device further comprises a second sensor. The second sensor is mounted on the rotator, and the first rotation data is measured by the second sensor.

For example, the at least one side of the flexible display screen is parallel to an extension direction of the data line.

For example, the rotator include a first rotator and a second rotator, a first side of the flexible display screen is fixed onto the first rotator, a second side of the flexible display screen is fixed onto the second rotator, and the first side and the second side of the flexible display screen are opposite to each other.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

According to the embodiments of the present disclosure, there is provided a display method based on a flexible display screen, and the method comprises: determining a width of a visible region of the flexible display screen; according to the width of the visible region of the flexible display screen, determining data lines within a range of the visible region of the flexible display screen; outputting display data to the data lines within the range of the visible region of the flexible display screen, so as to display a picture in the visible region of the flexible display screen.

According to the embodiments of the present disclosure, there is provided a display device based on a flexible display screen. The display device comprises the flexible display screen. The display device further comprises a control circuit. The control circuit includes: a display width determining sub-circuit, configured to determine a width of a visible region of the flexible display screen; a data line range determining sub-circuit, configured to determine data lines within a range of the visible region of the flexible display screen according to the width of the visible region of the flexible display screen; and a display data outputting sub-circuit, configured to output display data to the data lines within the range of the visible region of the flexible display screen, so as to display a picture in the visible region of the flexible display screen.

In the display method and the display device according to the embodiments of the present disclosure, by outputting the display data to the data lines within the range of the visible region, it is possible to display the picture only in the visible region of the flexible display screen, and the picture does not display in a non-visible region of the flexible display screen, which reduces unnecessary energy consumption, and reduces power consumption of the flexible display screen.

Figure 1A:
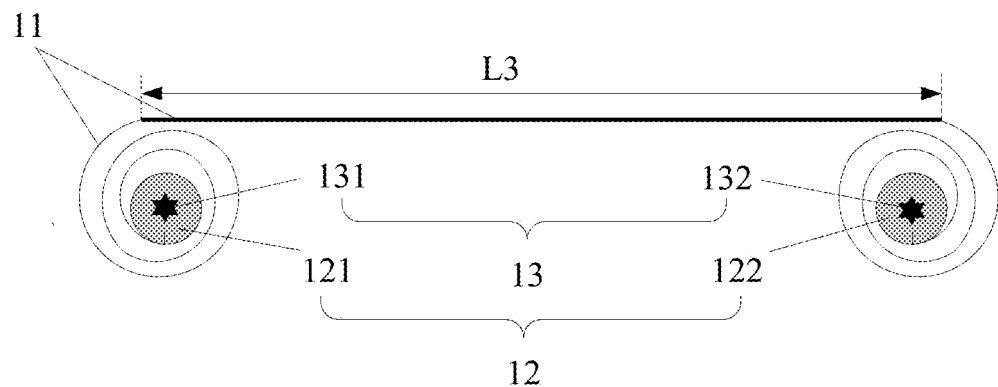
FIG. 1a shows a structural schematic view of a rotator according to embodiments of the present disclosure.

With reference to FIG. 1a, a structural schematic view of a rotator according to the embodiments of the present disclosure is shown.

For example, a flexible display screen 11 is fixed onto a rotator 12, so that a width of a visible region of the flexible display screen is lengthened or shortened by rotating the rotator. For example, when the rotator 12 is rotated in a first direction, the flexible display screen 11 is wound around the rotator 12, and the width of the visible region of the flexible display screen is shortened; when the rotator 12 is rotated in a second direction opposite to the first direction, a portion of the flexible display screen 11 wound around the rotator 12 is released from the rotator 12, and the width of the visible region of the flexible display screen is prolonged. For example, a sensor 13 is mounted on the rotator 12. For example, the rotator includes a first rotator 121 located on a first side of the flexible display screen and a second rotator 122 located on a second side of the flexible display screen, each rotator has a sensor mounted thereon; that is, the sensor 13 is mounted on the first rotator 121, and the sensor 13 is also mounted on the second rotator 122. The first side of the flexible display screen and the second side of the flexible display screen are opposite to each other. In FIG. 1a, L3 denotes the width of the visible region of the flexible display screen.

The first side and the second side of the flexible display screen are respectively fixed onto the first rotator 121 and the second rotator 122; the first rotator 121 and the second rotator 1221 respectively located on the first side and the second side of the flexible display screen may jointly control the width of the visible region of the flexible display screen, or may individually control the width of the visible region of the flexible display screen.

For example, in the embodiments of the present disclosure, only the first side or the second side of the flexible display screen is fixed onto the rotator, to implement controlling the width of the visible region of the flexible display screen on a single side. When the first side of the flexible display screen is fixed on the first rotator, the sensor is mounted on the first rotator, to facilitate the sensor mounted on the first rotator measuring the flexible display screen. When the second side of the flexible display screen is fixed onto the second rotator, the sensor is mounted on the second rotator to facilitate the sensor mounted on the second rotator measuring the flexible display screen.

For example, the sensor 13 is a first sensor as described below, or a second sensor as described below.

Figure 1B:
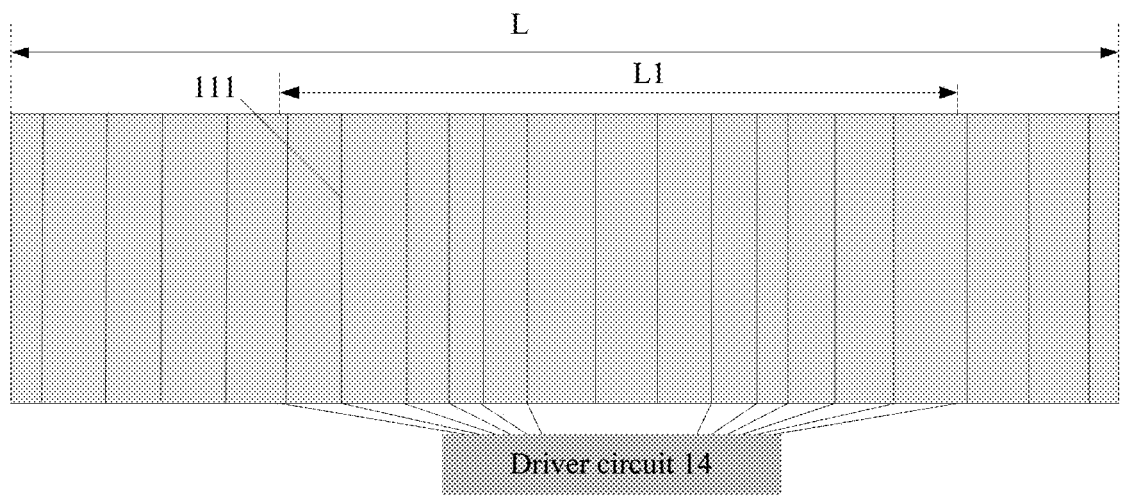
FIG. 1b shows a structural schematic view of a flexible display screen according to the embodiments of the present disclosure.

With reference to FIG. 1b, a structural schematic view of the flexible display screen according to the embodiments of the present disclosure is shown.

The flexible display screen 11 has a plurality of data lines 111 uniformly distributed. From the first side of the flexible display screen 11 to the second side of the flexible display screen 11, the plurality of data lines 111 are sequentially distributed, and each data line 111 has a unique serial number. For example, a maximum display width of the flexible display screen is L, which corresponds to M columns of data lines; an original display width of the flexible display screen is L1, which corresponds to N columns of data lines. For example, the flexible display screen includes a display region and a non-display region surrounding the display region, and the maximum display width of the flexible display screen refers to a width of the display region of the flexible display screen. The original display width of the flexible display screen refers to: the width of the visible region of the flexible display screen before the width of the visible region of the flexible display screen is adjusted by the first rotator and/or the second rotator. For example, a driver circuit 14 is connected with the plurality of data lines 111 of the flexible display screen 11. For example, the plurality of data lines 11 are parallel to the first side of the flexible display screen 11 and the second side of the flexible display screen 11.

Figure 1C:
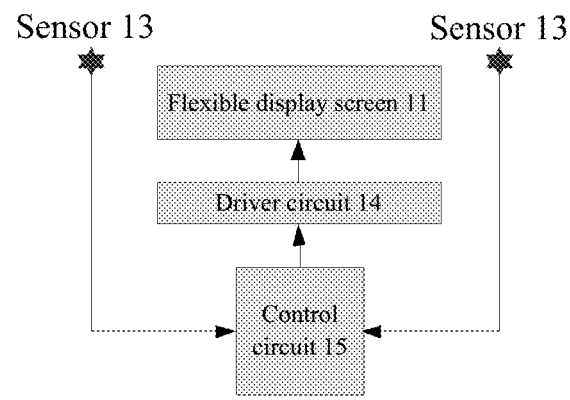
FIG. 1c shows a structural schematic view of a driving process of the flexible display screen according to the embodiments of the present disclosure.

With reference to FIG. 1c, a structural schematic view of a driving process of the flexible display screen according to the embodiments of the present disclosure is shown.

For example, the flexible display screen 11 is measured by the sensor 13 mounted on the first rotator 121 and the sensor 13 mounted on the second rotator 122, the measured data is transmitted to a control circuit 15, the control circuit 15 determines the width of the visible region of the flexible display screen according to the measured data and determines a range of serial numbers of data lines 111 within the range of the visible region of the flexible display screen 11, the control circuit 15 is connected with the driver circuit 14 and transmits the range of serial numbers of data lines 111 within the range of the visible region of the flexible display screen 11 to the driver circuit 14, the driver circuit 14 is connected with the data lines 111 of the flexible display screen 11 and outputs display data to the data lines 111 within the range of the visible region of the flexible display screen 11 according to the range of serial numbers, so as to display the picture in the visible region of the flexible display screen 11. For example, the measured data as described above includes a directly-measured width of the visible region of the flexible display screen and a first rotation data as described below.

Figure 2:
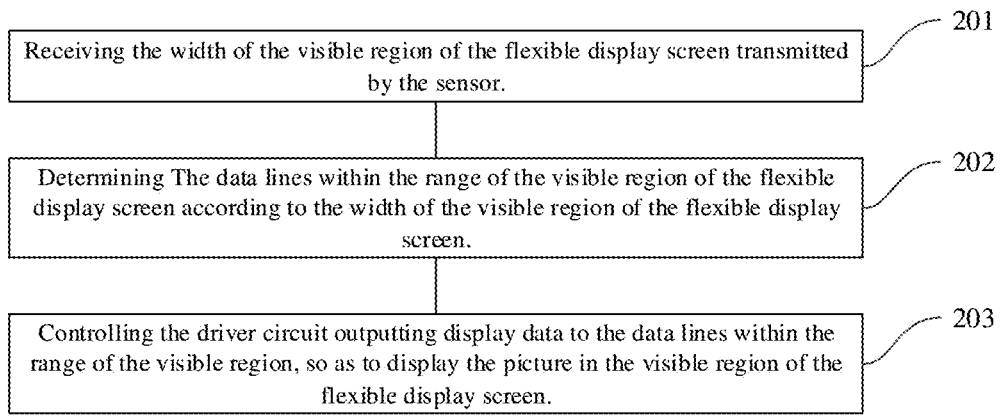
FIG. 2 shows a flow chart of a display method based on the flexible display screen according to the embodiments of the present disclosure.

With reference to FIG. 2, a flow chart of the display method based on the flexible display screen according to the embodiments of the present disclosure is shown. For example, the method comprises steps of:

Step 201: receiving the width of the visible region of the flexible display screen transmitted by the sensor.

In the embodiments of the present disclosure, the flexible display screen is fixed onto the rotator, and is provided with the sensor for measuring the width of the visible region of the flexible display screen; the width of the visible region of the flexible display screen is adjusted by the rotator, then the width of the visible region of the flexible display screen is measured by the sensor, the width data of the visible region is transmitted to the control circuit, and the control circuit receives the width data of the visible region of the flexible display screen transmitted by the sensor.

For example, the sensor is the first sensor, which directly measures the width of the visible region of the flexible display screen; for example, the first sensor is an optical sensor, for example, an infrared ranging sensor, which will not be limited herein by the embodiments of the present disclosure. For example, the rotator includes a rotating shaft, which will not be limited here by the embodiments of the present disclosure.

Step 202: determining the data lines within the range of the visible region of the flexible display screen according to the width of the visible region of the flexible display screen.

In the embodiments of the present disclosure, after receiving the width data of the visible region of the flexible display screen transmitted by the sensor, the control circuit determines the range of serial numbers of data lines within the range of the visible region of the flexible display screen according to the width data of the visible region.

Step 203: controlling the driver circuit outputting display data to the data lines within the range of the visible region, so as to display the picture in the visible region of the flexible display screen.

In the embodiments of the present disclosure, the control circuit is connected with the driver circuit, the driver circuit is connected with the data lines of the flexible display screen, the control circuit transmits a control instruction to the driver circuit, the control instruction includes the range of serial numbers of the data lines within the range of the visible region of the flexible display screen, the driver circuit receives the control instruction, and outputs the display data to the data lines within the range of the visible region of the flexible display screen according to the control instruction. For example, the display data is converted in a conversion circuit of the flexible display screen into a voltage signal for displaying the picture, so as to display the picture in the visible region of the flexible display screen according to the voltage signal.

For example, the driver circuit includes a source driver circuit, which will not be limited here by the embodiments of the present disclosure.

The embodiments of the present disclosure have advantages as follows. In the display method based on the flexible display screen according to the embodiments of the present disclosure, the width data of the visible region of the flexible display screen transmitted by the sensor is received, the data lines within the range of the visible region of the flexible display screen are determined according to the width data, the driver circuit is controlled to output the display data to the data lines within the range of the visible region, so as to display the picture in the visible region of the flexible display screen. The data lines within the range of the visible region are determined according to the width data of the flexible display screen, and the display data is output to the data lines within the range of the visible region, to display the picture in the visible region, so as to solve a problem that the display region of the flexible display screen does not vary with variation of the visible region, and the picture still is displayed within the non-visible region of the flexible display screen, resulting in extra power loss of the flexible display screen. By controlling outputting the display data to the data lines within the range of the visible region, it is possible to display the picture only in the visible region of the flexible display screen, and the picture is not displayed in the non-visible region of the flexible display screen, which reduces unnecessary energy consumption, and reduces power consumption of the flexible display screen.

Figure 3:
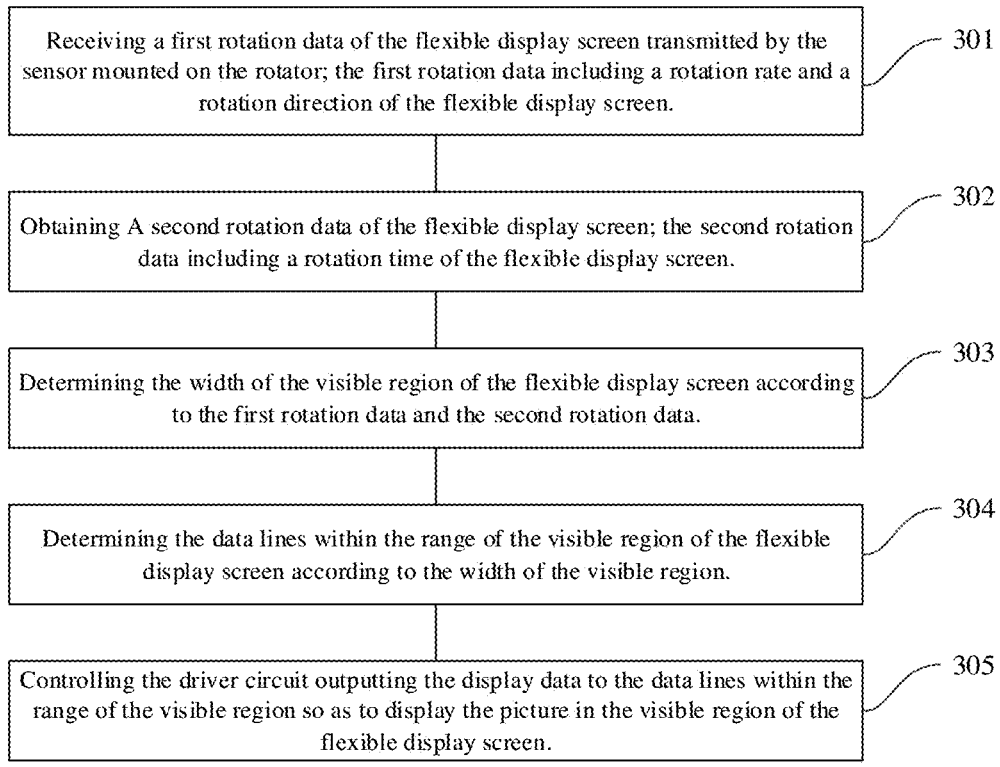
FIG. 3 shows another flow chart of the display method based on the flexible display screen according to the embodiments of the present disclosure.

With reference to FIG. 3, another flow chart of the display method based on the flexible display screen according to the embodiments of the present disclosure is shown; for example, the method comprises steps of:

Step 301: receiving the first rotation data of the flexible display screen transmitted by the sensor mounted on the rotator; the first rotation data including a rotation rate and a rotation direction of the flexible display screen.

For example, two sides of the flexible display screen are fixed onto the rotators, the rotators include the first rotator located on the first side of the flexible display screen and the second rotator located on the second side of the flexible display screen; through the rotators located on the two sides of the flexible display screen, it is possible to control the flexible display screen to be lengthened or shortened on either a single side or both sides. The sensors are mounted on both the first rotator and the second rotator. For example, the sensor is the second sensor, which measures the rotation rate and the rotation direction. For example, the second sensor includes an angular rate sensor, and the angular rate sensor includes a Microelectromechanical Systems (MEMS) gyroscope, which will not be limited here by the embodiments of the present disclosure.

For example, the flexible display screen is powered on, the control circuit firstly controls the rotator performing a reset operation on the flexible display screen, so that the flexible display screen has a reset display width, and so that the flexible display screen has a reset rotation width. For example, the reset display width and the reset rotation width are set according to an actual situation. Alternatively, the flexible display screen is powered on, the flexible display screen maintains the display width when powered down last time, so that the flexible display screen has a historical display width, and so that the flexible display screen has a historical rotation width, which will not be limited here by the embodiments of the present disclosure. For example, the original display width of the flexible display screen includes the reset display width or the historical display width.

The width of the visible region of the flexible display screen is adjusted by the first rotator and/or the second rotator, and the first rotation data of the flexible display screen is measured by a corresponding sensor on the rotator; the first rotation data includes the rotation rate and the rotation direction of the rotator, the first rotation data is transmitted to the control circuit, and the control circuit receives the first rotation data with respect to the flexible display screen transmitted by the sensor.

For example, the flexible display screen is powered on, the control circuit controls the rotator performing the reset operation on the flexible display screen, so that the reset display width of the flexible display screen is L1, in which case, the reset display width L1 is the original display width of the flexible display screen. The first rotator located on the first side of the flexible display screen is rotated, the width of the visible region of the flexible display screen is adjusted by the first rotator, and the sensor mounted on the first rotator measures the rotation rate and the rotation direction of the flexible display screen, the rotation rate being V1, and the rotation direction being a direction in which the width of the visible region of the flexible display screen is lengthened or shortened. The second rotator located on the second side of the flexible display screen is rotated, the width of the visible region of the flexible display screen is adjusted by the second rotator, and the sensor mounted on the second rotator measures the rotation rate and the rotation direction of the flexible display screen, the rotation rate being V2, and the rotation direction being the direction in which the width of the visible region of the flexible display screen is lengthened or shortened. The first rotator located on the first side of the flexible display screen and the second rotator located on the second side of the flexible display screen are rotated, the width of the visible region of the flexible display screen is adjusted by the first rotator and the second rotator located on the two sides of the flexible display screen, the sensors mounted on the first rotator and the second rotator respectively measure the rotation rate and the rotation direction of the flexible display screen, the first rotator having the rotation rate of V1, and the rotation direction being the direction in which the width of the visible region of the flexible display screen is lengthened or shortened, the second rotator having the rotation rate of V2, and the rotation direction being the direction in which the width of the visible region of the flexible display screen is lengthened or shortened, and V1 and V2 being either the same or different, which will not be limited here by the embodiments of the present disclosure.

Step 302: obtaining a second rotation data of the flexible display screen, the second rotation data including a rotation time of the flexible display screen.

In the embodiments of the present disclosure, during the first rotator and/or the second rotator adjusts the width of the visible region of the flexible display screen, the second rotation data of the flexible display screen is obtained; the second rotation data includes the rotation time of the flexible display screen. For example, the control circuit includes a clock, which has a timing function; when it starts receiving the first rotation data of the flexible display screen transmitted by the sensor, timing is started; when it stops receiving the first rotation data of the flexible display screen transmitted by the sensor, timing is stopped; and the rotation time of the first rotator and/or the second rotator is obtained by the clock of the control circuit.

For example, the first rotator located on the first side of the flexible display screen is rotated, the rotation time of the first side of the flexible display screen is T1; the second rotator located on the second side of the flexible display screen is rotated, the rotation time of the second side of the flexible display screen is T2; the first rotator located on the first side of the flexible display screen and the second rotator located on the second side of the flexible display screen are rotated, the rotation time of the first side of the flexible display screen is T1, the rotation time of the second side of the flexible display screen is T2, and T1 and T2 are the same or different.

Step 303: determining the width of the visible region of the flexible display screen according to the first rotation data and the second rotation data.

In the embodiments of the present disclosure, after obtaining the first rotation data and the second rotation data, the control circuit determines the width of the visible region of the flexible display screen according to the first rotation data and the second rotation data.

Exemplarily, the step 303 includes:

Sub-step 3031: performing an integral operation to determine a variation width of the flexible display screen according to the rotation rate and the rotation time.

In the embodiments of the present disclosure, after obtaining the rotation rate and the rotation time of the first rotator and/or the second rotator, the control circuit performs the integral operation to determine the variation width of the flexible display screen, according to the rotation rate and the rotation time.

An integral operation formula is $L2=\int_0^T VdT$, L2 denotes the variation width of the flexible display screen, V denotes the rotation rate of the rotator, and T denotes the rotation time of the rotator.

For example, the first rotator located on the first side of the flexible display screen and the second rotator located on the second side of the flexible display screen are rotated. In the case that the first rotator controls the display width of the flexible display screen to be lengthened, the variation width of the first side of the flexible display screen $L2_1=\int_0^{T1} VdT1$; and in the case that the first rotator controls the display width of the flexible display screen to be shortened, the variation width of the first side of the flexible display screen $L2_1=-\int_0^{T1} VdT1$, where, V1 denotes the rotation rate of the first rotator, and T1 denotes the rotation time of the first rotator. In the case that the second rotator controls the display width of the flexible display screen to be lengthened, the variation width of the second side of the flexible display screen $L2_2=\int_0^{T2} VdT2$; and in the case that the second rotator controls the display width of the flexible display screen to be shortened, the variation width of the second side of the flexible display screen $L2_2=-\int_0^{T2} V2dT2$, where, V2 denotes the rotation rate of the second rotator, and T2 denotes the rotation time of the second rotator. Then, the variation width of the flexible display screen $L2=L2_1+L2_2$.

In the case that only the first rotator located on the first side of the flexible display screen is rotated, the variation width of the flexible display screen $L2=L2_1$. In the case that only the second rotator located on the second side of the flexible display screen is rotated, the variation width of the flexible display screen $L2=L2_2$.

Sub-step 3032: determining the width of the visible region of the flexible display screen, according to the original display width, the variation width and the rotation direction of the flexible display screen; the original display width including the reset display width of the flexible display screen or the historical display width of the flexible display screen.

In the embodiments of the present disclosure, the width L3 of the visible region of the flexible display screen is determined according to the original display width L1 of the flexible display screen, the variation width L2 of the flexible display screen, and the rotation direction. The original display width includes the reset display width of the flexible display screen or the historical display width of the flexible display screen.

Figure 3A:
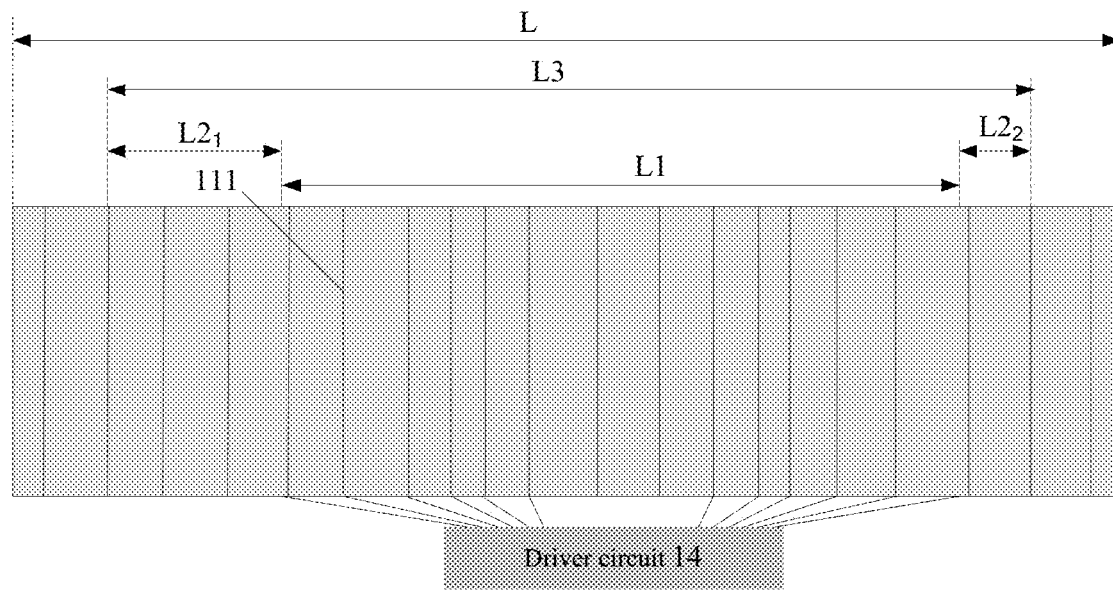
FIG. 3a shows a structural schematic view showing determining a width of a visible region of the flexible display screen.

With reference to FIG. 3a, on the basis of FIG. 1b, a structural schematic view of the width of the visible region of the flexible display screen is shown.

The original display width of the flexible display screen is L1, the variation width of the first side of the flexible display screen is $L2_1$, the variation width of the second side of the flexible display screen is $L2_2$, and the display widths of the first side and the second side of the flexible display screen are both prolonged, the variation width of the flexible display screen is $L2=L2_1+L2_2$, and the width of the visible region of the flexible display screen is L3=L1+L2.

For example, the original display width of the flexible display screen is the reset display width L1, the variation width of the flexible display screen is L2, and the rotation direction is the direction that the display width of the flexible display screen is lengthened, the width of the visible region of the flexible display screen is L3=L1+L2. Alternatively, during calculation, a center line position of the flexible display screen is taken as an origin, the original display widths of the first side and the second side of the flexible display screen are respectively L1/2; when the width of the visible region of the flexible display screen is adjusted by the first rotator located on the first side of the flexible display screen, the width of the visible region of the flexible display screen is L3=L1/2+L2 +L1/2.

Exemplarily, the step 303 includes:

Sub-step 3031: performing the integral operation to determine the variation width of the flexible display screen according to the rotation rate and the rotation time.

Sub-step 3033: determining the width of the visible region of the flexible display screen according to the original rotation width of the flexible display screen, the maximum width of the flexible display screen, the variation width and the rotation direction; the original rotation width including the reset rotation width of the flexible display screen or the historical rotation width of the flexible display screen.

In the embodiments of the present disclosure, the maximum width of the flexible display screen is L, and the original rotation width of the flexible display screen is L−L1; and the width L3 of the visible region of the flexible display screen is determined according to the original rotation width L−L1 of the flexible display screen, the maximum width L of the flexible display screen, the variation width L2 of the flexible display screen and the rotation direction. The original rotation width includes the reset rotation width of the flexible display screen or the historical rotation width of the flexible display screen.

For example, the original rotation width of the flexible display screen is the reset rotation width L−L1, the variation width of the flexible display screen is L2, the maximum width of the flexible display screen is L, and the rotation direction is the direction in which the display width of the flexible display screen is lengthened; in this case, the width of the visible region of the flexible display screen L3=L−(L−L1)+L2.

Step 304: determining the data lines within the range of the visible region of the flexible display screen according to the width of the visible region.

For example, the driver circuit is connected with the data lines of the flexible display screen, the data lines of the flexible display screen are uniformly distributed, and the data lines of the flexible display screen are arranged to have serial numbers; the width of the visible region of the flexible display screen is obtained, so that the range of the serial numbers of the data lines within the range of the visible region of the flexible display screen is determined according to the width of the visible region.

For example, a varied data line range is determined according to the variation width of the flexible display screen, and the range of the serial numbers of the data lines within the range of the visible region of the flexible display screen is determined according to the varied data line range and a data line range corresponding to the original display width.

Step 305: controlling the driver circuit outputting the display data to the data lines within the range of the visible region, so as to display the picture in the visible region of the flexible display screen.

The step is similar in principle to step 203 as described above and will not be described in detail here.

The embodiments of the present disclosure have advantages as follows. In the display method based on the flexible display screen according to the present disclosure, the first rotation data of the flexible display screen transmitted by the sensor mounted on the rotator is received, the second rotation data of the flexible display screen is obtained, the width of the visible region of the flexible display screen is determined according to the first rotation data and the second rotation data, the data lines within the range of the visible region of the flexible display screen are determined according to the width of the visible region, the driver circuit is controlled to output the display data to the data lines within the range of the visible region, so as to display the picture in the visible region of the flexible display screen. The width of the visible region of the flexible display screen is determined according to the first rotation data and the second rotation data, the data lines within the range of the visible region is determined according to the width of the visible region, the display data is output to the data lines within the range of the visible region, so as to display the picture in the visible region, which thus solves a problem that the display region of the flexible display screen does not vary with variation of the visible region, and the picture still is displayed within the non-visible region of the flexible display screen, resulting in extra power loss of the flexible display screen. By controlling outputting the display data to the data lines within the range of the visible region, it is possible to display the picture only in the visible region of the flexible display screen, and the picture is not displayed in the non-visible region of the flexible display screen, which reduces unnecessary energy consumption, and reduces power consumption of the flexible display screen.

With respect to the above method embodiments, in order to simplify description, all of them are described as a series of action combinations; however, those skilled in the art should know that, the embodiments of the present disclosure are not limited to the sequence of actions described because, according to the embodiments of the present disclosure, some steps may be performed in other sequences or simultaneously. Secondly, those skilled in the art should also know that, the embodiments described in the specification are all exemplary embodiments, and the actions involved are not necessarily essential to the embodiments of the present disclosure.

Figure 4:
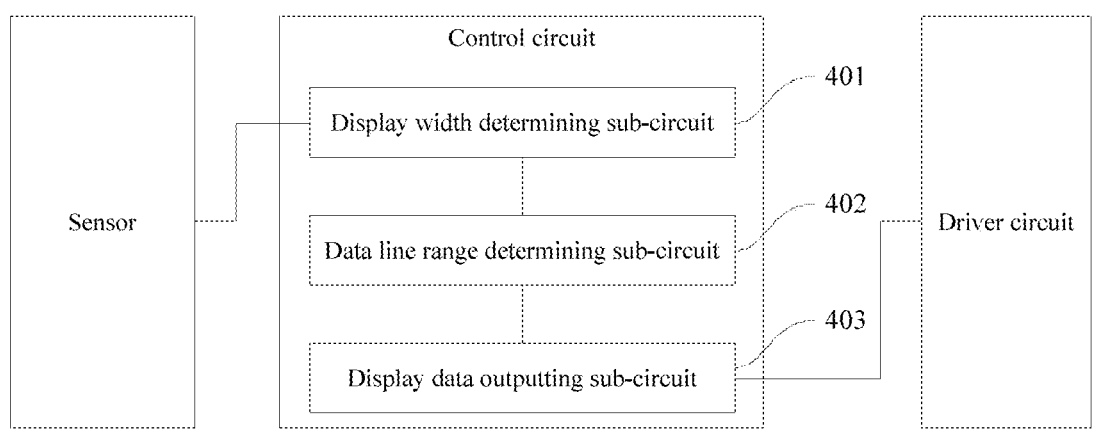
FIG. 4 shows a structural block view of a display device based on the flexible display screen according to the embodiments of the present disclosure.

According to the embodiments of the present disclosure, a display device based on a flexible display screen is provided. For example, with reference to FIG. 1c, the display device comprises the flexible display screen, the rotator, the sensor, the driver circuit and the control circuit as described above. For example, with reference to FIG. 4, the control circuit includes:

A display width determining sub-circuit 401, configured to receive a width of a visible region of the flexible display screen transmitted by the sensor. For example, the sensor directly measures the width of the visible region of the flexible display screen.

A data line range determining sub-circuit 402, configured to determine data lines within the visible region of the flexible display screen according to the width of the visible region.

A display data outputting sub-circuit 403, configured to output display data to the data lines within the visible region, so as to display a picture in the visible region of the flexible display screen.

The embodiments of the present disclosure have advantages as follows. In the display device based on the flexible display screen according to the embodiments of the present disclosure, the width data of the visible region of the flexible display screen transmitted by the sensor is received, the data lines within the range of the visible region of the flexible display screen are determined according to the width data, the driver circuit is controlled to output the display data to the data lines within the range of the visible region, so as to display the picture in the visible region of the flexible display screen. The data lines within the range of the visible region are determined according to the width data of the flexible display screen, and the display data is output to the data lines within the range of the visible region, to display the picture in the visible region, so as to solve a problem that a display region of the flexible display screen does not vary with variation of the visible region, and the picture is still displayed within a non-visible region of the flexible display screen, resulting in extra power loss of the flexible display screen. By controlling outputting the display data to the data lines within the range of the visible region, it is possible to display the picture only in the visible region of the flexible display screen, and the picture is not displayed in the non-visible region of the flexible display screen, which reduces unnecessary energy consumption, and reduces power consumption of the flexible display screen.

Figure 5:
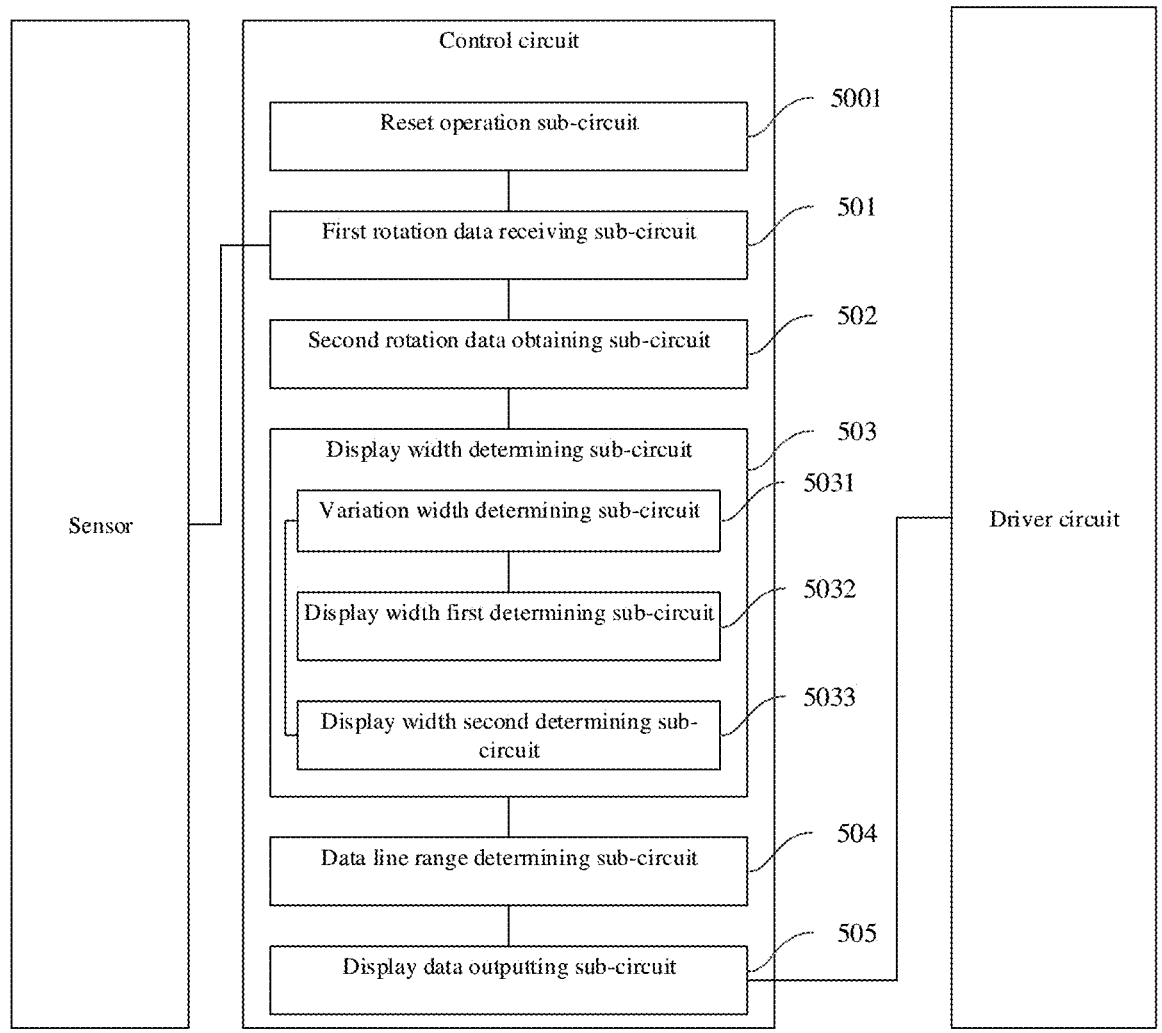
FIG. 5 shows another structural block view of the display device based on the flexible display screen according to the embodiments of the present disclosure.

According to the embodiments of the present disclosure, there is further provided a display device based on a flexible display screen. For example, with reference to FIG. 1c, the display device comprises the display screen, the rotator, the sensor, the driver circuit and the control circuit as described above. For example, with reference to FIG. 5, the control circuit includes:

A first rotation data receiving sub-circuit 501, configured to receive a first rotation data of the flexible display screen transmitted by the sensor mounted on the rotator; the first rotation data including a rotation rate and a rotation direction of the flexible display screen.

A second rotation data obtaining sub-circuit 502, configured to obtain a second rotation data of the flexible display screen, the second rotation data including a rotation time of the flexible display screen.

A display width determining sub-circuit 503, configured to determine a width of a visible region of the flexible display screen according to the first rotation data and the second rotation data.

Exemplarily, the control circuit further includes: a reset operation sub-circuit 5001, configured to control the rotator performing a reset operation on the flexible display screen, to make the flexible display screen have a reset display width and make the flexible display screen have a reset rotation width, before obtaining the first rotation data and the second rotation data.

For example, the display width determining sub-circuit 503 includes:

A variation width determining sub-circuit 5031, configured to perform an integral operation to determine a variation width of the flexible display screen, according to the rotation rate and the rotation time;

A display width first determining sub-circuit 5032, configured to determine the width of the visible region of the flexible display screen according to an original display width, the variation width and the rotation direction of the flexible display screen; the original display width including the reset display width of the flexible display screen or a historical display width of the flexible display screen.

The display width determining module 503 further includes:

A variation width determining sub-circuit 5031, configured to perform the integral operation to determine the variation width of the flexible display screen, according to the rotation rate and the rotation time;

A display width second determining sub-circuit 5033, configured to determine the width of the visible region of the flexible display screen according to an original rotation width of the flexible display screen, a maximum width of the flexible display screen, the variation width and the rotation direction; the original rotation width including the reset rotation width of the flexible display screen or a historical rotation width of the flexible display screen.

A data line range determining sub-circuit 504, configured to determine the data lines within the visible region of the flexible display screen according to the display width.

A display data outputting sub-circuit 505, configured to output display data to the data lines within the visible region, so as to display a picture in the visible region of the flexible display screen.

The embodiments of the present disclosure have advantages as follows. In the display device based on the flexible display screen according to the embodiments of the present disclosure, the first rotation data of the flexible display screen transmitted by the sensor mounted on the rotator is received, the second rotation data of the flexible display screen is obtained, the width of the visible region of the flexible display screen is determined according to the first rotation data and the second rotation data, the data lines within the range of the visible region of the flexible display screen are determined according to the display width, the driver circuit is controlled to output the display data to the data lines within the range of the visible region of the flexible display screen, so as to display the picture in the visible region of the flexible display screen. The width of the visible region of the flexible display screen is determined according to the first rotation data and the second rotation data, the data lines within the range of the visible region are determined according to the display width, and the display data is output to the data lines within the range of the visible region, to display the picture in the visible region, so as to display the picture in the visible region, which thus solves a problem that the display region of the flexible display screen does not vary with variation of the visible region, and the picture is still displayed within the non-visible region of the flexible display screen, resulting in extra power loss of the flexible display screen. By outputting the display data to the data lines within the range of the visible region, it is possible to display the picture only in the visible region of the flexible display screen, and the picture is not displayed in the non-visible region of the flexible display screen, which reduces unnecessary energy consumption, and reduces power consumption of the flexible display screen.

With respect to the above device embodiments, since they are basically similar to the method embodiments, description is relatively simple; please refer to part of the description of the method embodiments for the relevant part.

The algorithms and display provided herein are not inherently related to any specific computer, virtual system, or other device. Various general-purpose systems may also be used with teachings based here. According to the above description, the structure required to construct such a system is obvious. In addition, the present disclosure is not directed to any specific programming language. It should be understood that, various programming languages may be used for implementing contents of the present disclosure as described herein, and the specific language is described above in order to disclose the best implementing mode of the present disclosure.

In the specification provided herein, numerous specific details are illustrated; however, it should be understood that the embodiments of the present disclosure may be practiced without these specific details. In some embodiments, well-known methods, structures and techniques are not shown in detail in order not to obscure understanding of the specification.

The various component embodiments of the present disclosure may be implemented in hardware or in software modules running on one or more processors, or in a combination thereof. It should be understood by those skilled in the art that, some or all functions of some or all components of the display device and the display method based on the flexible display screen according to the embodiments of the present disclosure may be implemented in practice with a microprocessor or a digital signal processor (DSP). The present disclosure may also be implemented as part or all of the apparatuses or apparatus programs (e.g., computer programs and computer program products) for performing the methods as described herein. Such a program for implementing the present disclosure may be stored on a computer readable medium, or may have a form of one or more signals. Such signals may be downloaded from Internet websites, or provided on carrier signals, or provided in any other form.

It should be noted that, the foregoing embodiments merely are exemplary embodiments of the present disclosure, and not intended to define the scope of the present disclosure; and those skilled in the art can also design alternative embodiments without departing from the scope of the appended claims. In the claims, any reference sign placed between parentheses shall not be construed as limiting the claim. The word "comprising" does not exclude presence of elements or steps not listed in the claim. The present disclosure may be implemented by means of hardware comprising several different elements and by means of a suitably programmed computer. In the product claims enumerating several sub-parts, several of these sub-parts may be embodied by a same item of hardware. The use of the words first, second, and third etc. does not denote any order.

The invention claimed is:

1. A display method based on a flexible display screen, comprising:
   determining a width of a visible region of the flexible display screen;
   determining data lines within a range of the visible region of the flexible display screen according to the width of the visible region of the flexible display screen;
   outputting display data to the data lines within the range of the visible region of the flexible display screen, so as to display a picture in the visible region of the flexible display screen, wherein at least one side of the flexible display screen is fixed onto a rotator, such that the width of the visible region of the flexible display screen is lengthened or shortened during rotation of the rotator; and
   wherein the determining the width of the visible region of the flexible display screen includes:
   determining a first rotation data of the flexible display screen, the first rotation data including a rotation rate and a rotation direction of the flexible display screen,
   determining a second rotation data of the flexible display screen, the second rotation data including a rotation time of the flexible display screen, and
   determining the width of the visible region of the flexible display screen according to the first rotation data and the second rotation data.

2. The display method according to claim 1, wherein, the determining the width of the visible region of the flexible display screen according to the first rotation data and the second rotation data includes:
   performing an integral operation to determine a variation width of the flexible display screen according to the rotation rate and the rotation time; and
   determining the width of the visible region of the flexible display screen, according to an original display width of the flexible display screen, the variation width of the flexible display screen and the rotation direction; the original display width including a reset display width of the flexible display screen or a historical display width of the flexible display screen.

3. The display method according to claim 1, wherein, the determining the width of the visible region of the flexible display screen according to the first rotation data and the second rotation data includes:
   performing an integral operation to determine a variation width of the flexible display screen according to the rotation rate and the rotation time; and
   determining the width of the visible region of the flexible display screen according to an original rotation width of the flexible display screen, a maximum width of the flexible display screen, the variation width of the flexible display screen and the rotation direction; the original rotation width including a reset rotation width of the flexible display screen or a historical rotation width of the flexible display screen.

4. The method according to claim 2, wherein, before the determining the first rotation data and the second rotation data of the flexible display screen, the method further comprises: performing a reset operation on the flexible display screen with the rotator, so that the flexible display screen has the reset display width.

5. The method according to claim 1, wherein, a second sensor is mounted on the rotator, and the first rotation data is measured by the second sensor.

6. The method according to claim 1, wherein, the at least one side of the flexible display screen is parallel to an extension direction of the data line.

7. The method according to claim 1, wherein, the rotator include a first rotator and a second rotator, a first side of the flexible display screen is fixed onto the first rotator, a second side of the flexible display screen is fixed onto the second rotator, and the first side and the second side of the flexible display screen are opposite to each other.

8. A display device based on a flexible display screen, comprising a control circuit, wherein the control circuit includes:
   a display width determining sub-circuit, configured to determine a width of a visible region of the flexible display screen;
   a data line range determining sub-circuit, configured to determine data lines within a range of the visible region of the flexible display screen according to the width of the visible region of the flexible display screen; and
   a display data outputting sub-circuit, configured to output display data to the data lines within the range of the visible region of the flexible display screen, so as to display a picture in the visible region of the flexible display screen, and
   wherein the display device further comprises a rotator,
   wherein at least one side of the flexible display screen is fixed onto the rotator, such that the width of the visible region of the flexible display screen is lengthened or shortened during rotation of the rotator,
   wherein the control circuit further includes: a first rotation data receiving sub-circuit, configured to receive a first rotation data of the flexible display screen, the first rotation data including a rotation rate and a rotation direction of the flexible display screen; and a second rotation data obtaining sub-circuit, configured to obtain a second rotation data of the flexible display screen, the second rotation data including a rotation time of the flexible display screen, and
   wherein the display width determining sub-circuit is configured to: determine the width of the visible region of the flexible display screen according to the first rotation data and the second rotation data.

9. The display device according to claim 8, wherein, the display width determining sub-circuit includes:
   a variation width determining sub-circuit, configured to perform an integral operation to determine a variation width of the flexible display screen according to the rotation rate and the rotation time; and
   a display width first determining sub-circuit, configured to determine the width of the visible region of the flexible display screen, according to an original display width of the flexible display screen, the variation width of the flexible display screen and the rotation direction; the original display width of the flexible display screen including a reset display width of the flexible display screen or a historical display width of the flexible display screen.

10. The display device according to claim 8 wherein, the display width determining sub-circuit includes:
   a variation width determining sub-circuit, configured to perform an integral operation to determine a variation width of the flexible display screen according to the rotation rate and the rotation time; and
   a display width second determining sub-circuit, configured to determine the width of the visible region of the flexible display screen according to an original rotation width of the flexible display screen, a maximum width of the flexible display screen, the variation width of the flexible display screen and the rotation direction; the original rotation width of the flexible display screen including a reset rotation width of the flexible display screen or a historical rotation width of the flexible display screen.

11. The display device according to claim 9, wherein, the control circuit further includes a reset operation sub-circuit, and the reset operating sub-circuit is configured to: control the rotator performing a reset operation on the flexible display screen, so that the flexible display screen has the reset display width, before the first rotation data receiving sub-circuit receives the first rotation data of the flexible display screen and the second rotation data obtaining sub-circuit obtains the second rotation data of the flexible display screen.

12. The display device according to claim 8, further comprising a second sensor, wherein, the second sensor is mounted on the rotator, and the first rotation data is measured by the second sensor.

13. The display device according to claim 8, wherein, the at least one side of the flexible display screen is parallel to an extension direction of the data line.

14. The display device according to claim 8, wherein, the rotator include a first rotator and a second rotator, a first side of the flexible display screen is fixed onto the first rotator, a second side of the flexible display screen is fixed onto the second rotator, and the first side and the second side of the flexible display screen are opposite to each other.

15. The method according to claim 3, wherein, before the determining the first rotation data and the second rotation data of the flexible display screen, the method further comprises: performing a reset operation on the flexible display screen with the rotator, so that the flexible display screen has the reset rotation width.

16. The display device according to claim 10, wherein, the control circuit further includes a reset operation sub-circuit, and the reset operating sub-circuit is configured to: control the rotator performing a reset operation on the flexible display screen, so that the flexible display screen has the reset rotation width, before the first rotation data receiving sub-circuit receives the first rotation data of the flexible display screen and the second rotation data obtaining sub-circuit obtains the second rotation data of the flexible display screen.

* * * * *